United States Patent
Roesgen et al.

[11] Patent Number: 6,082,423
[45] Date of Patent: *Jul. 4, 2000

[54] LOW COST LIGHT WEIGHT RADIAL TIRE

[75] Inventors: Alain Emile Francois Roesgen, Grevenknapp; Atte Smits, Bofferdange, both of Luxembourg; Marie-Rita Catherine Amelie Thise-Fourgon, Bastogne, Belgium; Eric Gerard Marie Packbier, Drauffelt; David Paterson Craig, Luxembourg, both of Luxembourg

[73] Assignee: The Goodyear Tire & Rubber Company, Akron, Ohio

[ * ] Notice: This patent is subject to a terminal disclaimer.

[21] Appl. No.: 08/871,263

[22] Filed: Jun. 9, 1997

[51] Int. Cl.⁷ .............................. B60C 9/20; B60C 9/22; B60C 11/00; B60C 19/00; B60C 5/00

[52] U.S. Cl. .................. 152/209.1; 152/209.14; 152/454; 152/527; 152/531; 152/533; 152/536; 152/542; 152/543; 152/546; 152/547; 152/549

[58] Field of Search .................... 152/454, 526, 152/510, 523, 531, 533, 536, 542, 543, 546, 547, 555, 527, 209.1, 209.14

[56] References Cited

U.S. PATENT DOCUMENTS

| | | |
|---|---|---|
| 3,762,458 | 10/1973 | Yoshida et al. . |
| 3,763,912 | 10/1973 | Bergomi et al. . |
| 3,785,423 | 1/1974 | do Carbon . |
| 3,961,657 | 6/1976 | Chrobak ........................ 152/546 X |
| 4,082,132 | 4/1978 | Arai et al. .................... 152/454 X |
| 4,177,852 | 12/1979 | Merli et al. . |
| 4,311,628 | 1/1982 | Abdou-Sabet et al. ............ 524/447 |
| 4,387,759 | 6/1983 | Obata et al. ................ 152/547 X |
| 4,513,802 | 4/1985 | Togashi et al. ............... 152/546 X |
| 4,722,989 | 2/1988 | Starner et al. .................... 528/64 |
| 4,815,511 | 3/1989 | Brayer et al. .................. 152/209.14 |
| 4,823,855 | 4/1989 | Goergen et al. ............... 152/454 X |
| 5,263,526 | 11/1993 | Oare et al. . |
| 5,368,082 | 11/1994 | Oare et al. . |
| 5,373,883 | 12/1994 | Kogure et al. . |
| 5,385,188 | 1/1995 | Kogure et al. . |
| 5,407,701 | 4/1995 | Reuter ........................... 152/527 X |
| 5,411,068 | 5/1995 | Kogure . |
| 5,415,216 | 5/1995 | Kajiwara et al. . |
| 5,429,169 | 7/1995 | Igarashi et al. . |
| 5,443,105 | 8/1995 | Ushikubo et al. . |
| 5,479,977 | 1/1996 | Tamano et al. . |
| 5,524,688 | 6/1996 | Trares et al. . |
| 5,529,105 | 6/1996 | Hayashi et al. . |
| 5,535,800 | 7/1996 | Abbott . |
| 5,538,063 | 7/1996 | Dwenger et al. . |

FOREIGN PATENT DOCUMENTS

| | | |
|---|---|---|
| 412928A2 | 2/1991 | European Pat. Off. . |
| 454432A2 | 10/1991 | European Pat. Off. . |
| 614774A1 | 9/1994 | European Pat. Off. . |
| 698510A2 | 2/1996 | European Pat. Off. . |
| 749854A1 | 12/1996 | European Pat. Off. . |
| 754573A1 | 1/1997 | European Pat. Off. . |
| 760298A2 | 3/1997 | European Pat. Off. . |
| 5-178005 | 7/1993 | Japan ............................. 152/454 |

OTHER PUBLICATIONS

Mechanics of Pneumatic Tires ed. Samuel Clark: US Dept. of Transportation, pp. 595–596, Aug. 1981.

*Primary Examiner*—Adrienne C. Johnstone
*Attorney, Agent, or Firm*—David L King

[57] ABSTRACT

A very light weight tire 10 has at least one radial ply 38 and a rayon belt structure 36, having two single cut belt layers 50, 51 covered by an overlay 59 having cords 80 selected from the group of aramid, rayon, PEN, PET and PVA. The tire 10 has a very thin or reduced gauge (t) undertead 13. The tire 10 can be made having very low rolling resistance due to the combination of casing structure and the reduced rubber mass.

44 Claims, 2 Drawing Sheets

LOW COST LIGHT WEIGHT RADIAL TIRE

TECHNICAL FIELD

This invention relates to pneumatic tires. More particularly to light weight radial ply tires having an aspect ratio of less than 0.8.

BACKGROUND OF THE INVENTION

Tire engineers have historically attempted to build very durable casing structures that can survive the severe driving conditions that the vehicle operators put the tires through.

Early on tires were very heavy and employed many layers or plies of bias cord. The primary objective was to simply retain the air and avoid a flat or deflation.

Through a process of endless research to develop more durable and better tire constructions new materials and better designs have been developed.

The introduction of the radial tire made it practical to develop tires having as few as one carcass ply. The ply was contained radially by a belt structure. To enhance the durability of the tire these belt structures evolved to become primarily steel reinforced. These steel reinforced belts yielded and currently provide a very durable structure.

These steel belted tires have many benefits that make their use attractive. The steel cords are not heat sensitive that is their physical properties are pretty much constant regardless of the tire's operating temperature. The steel cords are substantially inextensible and the cords can be made very high strength with fine filaments that have excellent fatigue resistance. Nevertheless these steel corded belts in tires have resulted in the need to add rubber gauge directly above the belts in the area commonly referred to as the undertread, in the belt layers themselves and in the areas of the belt edges, all in an attempt to keep these steel cords from becoming exposed or structurally separating at the edges. In many cases the strength of the steel belt is not needed and the weight of alternative organic cords is much less.

The resultant effect has been that the steel belted radial tires are in fact heavier using more rubber in the tread area and in the tire's shoulders. It is precisely in these areas that a large part of the tire's tread wear performance and sensitivity to rolling resistance must be the highest. The more rubber in this area the higher the hysertesis effects and higher the temperatures under running conditions.

It is now an object of tire designers to develop tires that generate lower car fuel consumption. This can be achieved by designing cool running tires that have low mass and low rotational inertia while increasing the tire's handling performance and treadwear, furthermore, the engineer must insure that the tire's footprint and the contact patch of the tread has a uniform pressure distribution in order to achieve uniform wear.

With the advent of high performance tires having very low aspect ratios the use of belt structures having overlays of synthetic cords of nylon or aramid has been common. To further achieve high speed performance the tread thickness has been kept at a minimum. Thick tread mass at high speeds simply want to fly off the tire. As these tires are pushed to the engineer's known tire design limit he had to rethink the entire parameters of the tire. In some cases this means going back and reanalyzing the concepts that were used in the past but were abandoned as a result of those in the art pursuing a different path.

One path that the engineer needs to consider is how to get most of the benefits of a light weight tire without incurring the substantial cost penalties of some of the tire components that have been used to achieve the very high speed durability of the more expensive touring performance tires.

SUMMARY OF THE INVENTION

A radial ply tire 10 exhibiting very light weight and low rolling resistance has an aspect ratio in the 0.2 to 0.8 range. The tire 10 has a pair of parallel annular bead cores 26; one or more radial carcass plies 38, at least one radial carcass ply 38 being wrapped around said bead cores 26; a belt structure 36 disposed radially outwardly of said one or more radial carcass ply 38 in a crown area of the tire 10; and an overlay 59 having a width coinciding substantially with the width of the belt structure 36. A tread 12 is disposed radially outwardly of said overlay 59 and a sidewall 20 is disposed between the tread 12 and said beads 26.

The overlay 59 has filaments or cords 70, the filaments or cords 70 being selected form a group of materials that are preferably relatively non-heat shrinkable, the group being rayon, polyethylene terephthalate (PET), aramid, polyethylene naphthalate (PEN), or polyvinl alcohol (PVA) embedded in an elastomer. The belt structure 36 is made from two rayon cord reinforced layers 50,51 having cord angles in the range of 16° to 28°, preferably about 22° with respect to the mid-circumferential centerplane of the tire. The rayon cord material is preferably from 1840/2 up to 2440/2/2, more preferably 2440/3 having an EPI of 18 to 30.

The overlay 59 is preferably spirally wound radially outward of and adjacent to the belt structure 36. The overlay 59 being made from a continuous strip of reinforcing tape having a width of ½ inch to 1½ inches having 4 to 45 parallel reinforcing filaments or cord 70 embedded therein.

In the preferred embodiment the overlay cords 70 are aramid, however, cords of high tensile strength, low thermal shrinkage such as rayon, PEN, PET or PVA can be used as well. The density of the overlay aramid cords 70 is about 15 to 30 ends per inch (EPI).

The tire 10 according to the invention has a very thin undertread 13, the undertread 13 being measured from the radially outer surface of the cords 70 of the overlay 59 to a circumferential groove of full depth. The undertread 13 thickness (t) is less than 2 mm and preferably about 1 mm.

To further enhance handling performance the tire 10 employs a hard apex 46 extending radially outwardly of each bead core 26 and adjacent the ply 38. The apex 46 have a Shore D hardness greater than or equal to 50.

To enhance lateral stability the tire 10 it can employ two sidewall inserts, one insert being in each sidewall 20. Each sidewall insert has two layers 52,53 of bias cord reinforcements. The cords of the first layer 52 oriented equal but opposite to the cords of the second layer 53, the two layers 52,53 being interposed between the apex 46 and the turnup 32 of the carcass ply 38. The cords of each layer are oriented at an angle of 25° to 60° relative to the radial direction. Preferably, the first and second layer 52,53 has a radially inner end 54 and a radially outer end 55, the respective ends 54,55 of one layer being staggered relative to the ends 54,55 of the opposite layer. The radially outer end 55 of one layer is located at about one-half of the tire's section height SH or at location h as shown.

The tire 10 further can have a noise dampening gumstrip 42 one originating below each belt edges and terminating at about 50% of the section height SH of the tire 10.

The cords 41 of the one or more carcass plies 38 can be selected from the group of rayon, nylon, PEN, PET, steel, or aramid. The preferred tire 10 employed one rayon carcass ply 38.

The tire 10 using the novel combination described above can be made very light weight at a moderately to very low cost compared to conventional tires having overlays.

The inventive tire 10 can demonstrate acceptable to good performance, particularly in handling with the added benefit of very low rolling resistance.

DEFINITIONS

Figure 1:
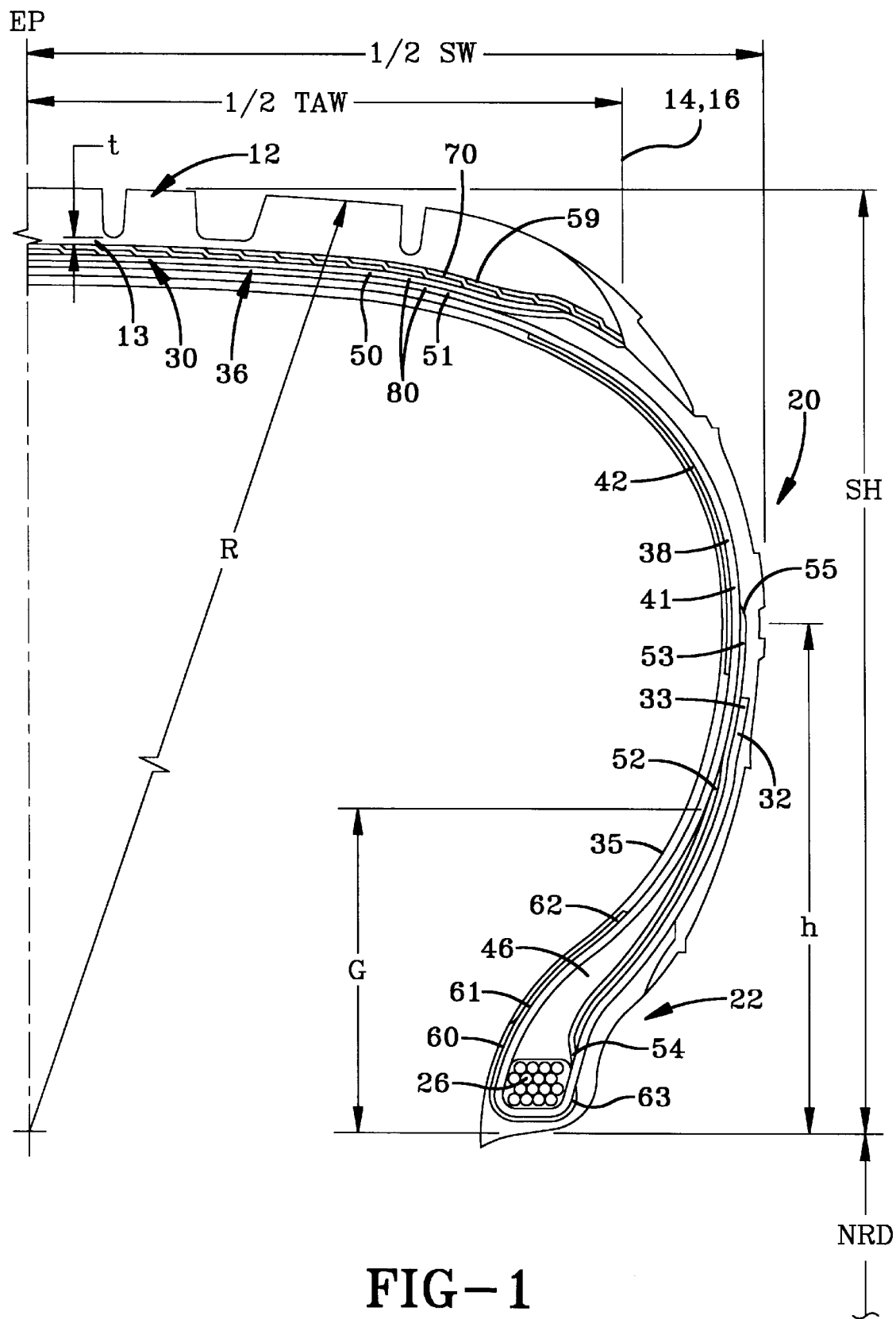
FIG. 1 is a cross-sectional view of one half of the embodiment tire 10 according to the present invention, the opposite half being of similar shape and construction.

"Aspect Ratio" means the ratio of its section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Circumferential" means lines or directions extending along the perimeter of the surface of the annular tread perpendicular to the axial direction.

"Carcass" means the tire structure apart from the belt structure, tread, and undertread, but including the beads.

"Casing" means the carcass, belt structure, beads, sidewalls and all other components of the tire excepting the tread and undertread.

"Chafers" refers to narrow strips of material placed around the outside of the bead to protect cord plies from the rim, distribute flexing above the rim.

"Cord" means one of the reinforcement strands of which the plies in the tire are comprised.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Ply" means a layer of rubber-coated parallel cords.

"Radial" and "radially" mean directions radially toward or away from the axis of rotation of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tread Width" means the arc length of the tread surface in the axial direction, that is, in a plane parallel to the axis of rotation of the tire.

DETAILED DESCRIPTION OF THE INVENTION

The tire 10 according to the present invention employs a unique structure. Tire 10 as illustrated in FIG. 1 is a radial passenger or light truck tire; the tire 10 is provided with a ground-engaging tread portion 12 which terminates in the shoulder portions at the lateral edges 14,16 of the tread 12 respectively. A pair of sidewall portions 20 extends from tread lateral edges 14,16 respectively and terminates in a pair of bead regions 22 each having an annular inextensible bead core 26 respectively. The tire 10 is further provided with a carcass reinforcing structure 30 which extends from bead region 22 through one sidewall portion 20, tread portion 12, the opposite sidewall portion 20 to bead region 22. The turnup ends 32 of at least one radial ply 38 carcass reinforcing structure 30 are wrapped about bead cores 26 and extend radially outwardly to a terminal end 33. The turnup 32 may end at about the radial location of the maximum section width in the embodiment of FIG. 1. The tire 10 may include a conventional innerliner 35 forming the inner peripheral surface of the tire 10 if the tire is to be of the tubeless type. In the preferred tire 10 the innerliner 35 is made of 100% bromobutyl or alternatively halobutyl.

As shown in FIG. 1 the tire 10 can employ a single synthetic ply wrapped over the bead core 26 and extending to a high turnup end 33 located at about the radial location of the maximum section diameter (h). Placed circumferentially about the radially outer surface of carcass reinforcing structure 30 beneath tread portion 12 is a tread reinforcing belt structure 36. In the particular embodiment illustrated, belt structure 36 comprises two cut belt plies 50,51 and the cords 80 of belt plies 50,51 are oriented at an angle of about 22 degrees with respect to the mid-circumferential centerplane of the tire.

The cords 80 of belt ply 50 are disposed in an opposite direction to the mid-circumferential centerplane and from that of the cords 80 of belt ply 51. However, the belt structure 36 may comprise any number of belt plies and the cords 80 may be disposed at any desired angle preferably in the 18° to 26° range. An important feature of the layers 50,51 is that each layer 50,51 is a single cut layer, neither layer having folded edges. The belt structure 36 provides lateral stiffness across the belt width so as to minimize lifting of the tread 12 from the road surface during operation of the tire 10. In the embodiments illustrated, this is accomplished by making the cords 80 of belt plies 50,51 of rayon and preferably having the following material properties from 1840/2 (twist 6/6 to 12/12 tpi) up to 2440/2/2 (twist 3/3 to 10/10 tpi) but preferably 2440/3 (twist 6.5/6.5 tpi) with an EPI of 18 to 24 and a cured angle of 16° to 28° after vulcanization preferably 22° having a density of 15–25 EPI construction.

The carcass reinforcing structure 30 comprises at least one reinforcing ply structure 38. In the particular embodiment illustrated in FIG. 1, there is provided a reinforcing ply structure 38 with a radially outer ply turnup 32, this ply structure 38 has preferably one layer of parallel cords 41. The cords 41 of reinforcing ply structure 38 are oriented at an angle of at least 75 degrees with respect to the mid-circumferential centerplane CP of the tire 10. In the particular embodiment illustrated, the cords 41 are oriented at an angle of about 90 degrees with respect to the mid-circumferential centerplane CP. The cords 41 may be made of any material normally used for cord reinforcement of rubber articles, for example, and not by way of limitation, rayon, nylon and polyester, aramid or steel. Preferably, the cords are made of material having a high adhesion property with rubber and high heat resistance.

For the carcass cords 41, organic fiber cords with an elastic modulus in the range of 250 to 600 kgf/sq mm such as nylon 6, nylon 6—6, rayon, polyester or high-modulus cords, commonly are used. In the case of 340-to-2100 dTex such fiber cords are used preferably at a density of 17 to 30 EPI.

Other high modulus fiber include aramid, vinylon, PEN, PET, PVA, carbon fiber, glass fiber, polyamides. Alternatively, steel cords of very high tensile strength steel having fine diameter filaments exhibiting excellent fatigue resistance could be used. In the particular preferred embodiment illustrated in FIGS. 1 and 2, the cords 41 are made from rayon. The cords 41 have a modulus E of X and a percent elongation of Y. The preferred rayon cord 41 has X values in the range of at least to 10 GPa and percent elongations in the range commonly found in the specific material of the cord.

As further illustrated in FIG. 1, the bead regions 22 of the tire 10 each have an annular substantially inextensible first and second bead cores 26 respectively.

The bead core is preferably constructed of a single or monofilament steel wire continuously wrapped. In the preferred embodiment 0.038 inch (0.97 mm) diameter high tensile steel wire is wrapped in four layers radially inner to radially outer of four wires, respectively, forming a 4×4 construction.

Located within the bead region 22 and the radially inner portions of the sidewall portions 20 are high modulus elastomeric apex inserts 46 disposed between carcass ply reinforcing structure 38 and the turnup ends 32, respectively. The elastomeric apex inserts 46 extend from the radially outer portion of bead cores 26 respectively, up into the sidewall portion gradually decreasing in cross-sectional width. The elastomeric inserts 46 terminate at a radially outer end at a distance G radially inward of the maximum section width of the tire at the location (h) as shown in FIG. 1. In the particular embodiment illustrated, the elastomeric apex inserts 46 each extend, from their respective bead cores 26 to a distance G of approximately 25 percent (25%) of the tire's section height.

For the purposes of this invention, the maximum section height SH of the tire shall be considered the radial distance measured from the nominal rim diameter NRD of the tire to the radially outermost part of the tread portion of the tire. Also, for the purposes of this invention, the nominal rim diameter shall be the diameter of the tire as designated by its size.

In a preferred embodiment of the invention the bead regions 22 further includes at least one cord reinforced member 52,53 located between the apex insert 46 and the ply turnup end 32. The cord reinforced member or members 52,53 have a first end 54 and a second end 55. The first end 54 is axially and radially inward of the second end 55. The cord reinforced member or members 52,53 increase in radial distance from the axis of rotation of the tire 10 as a function of distance from its first end 54. In the illustrated FIG. 1, the cord reinforced member comprises two components 52,53 having a width of about 4 cm. The axially inner component 52 has a radially inner end 54 that is radially at or slightly above the first and second bead cores 26. The axially outer component 53 has a radially inner end that is radially outward of the outer surface of the bead core 26 by about 1 cm. The axially inner and axially outer components 52,53, preferably have rayon, nylon, aramid or steel cord reinforcement, in the preferred embodiment tire nylon 1400/2 dTex cords were used. The second end 55 of the cord reinforced member 53 is located radially outward of the bead core 26 and the termination 33 of the turnup end 32 of the first ply 38 and it is radially located at a distance at least 50% of the section height SH as measured from the nominal bead diameter.

The cords of members 52,53 are preferably inclined forming an included angle relative to the radial direction in a range from 25° to 75°, preferably 55°. If two members are employed, the cord angles are preferably equal but oppositely disposed. The cord reinforcement member 52,53 improves the handling characteristics of the tire 10 of the present invention. The members 52,53 greatly reduce the tendency for the car to oversteer, a significant problem encountered in conventional tires that are driven while uninflated or underinflated.

A fabric reinforced member 61 may be added to the bead regions 22 of the tire 10. The fabric reinforced member has first and second ends 62,63. The member is wrapped about the first ply 38 and the bead core 26. Both the first and the second ends 62,63 extend radially above and outward of the bead core 26.

The sidewall portions 20 of the preferred embodiment tire 10 are provided with a pair of noise dampening gumstrips 42. The noise dampening gumstrips 42 are employed between the innerliner 35 and the reinforcement ply 38. The gumstrips 42 extend from under each belt edge in the shoulder region of tire 10 to radially inward of the reinforced member end 55. As illustrated in the preferred embodiment of the invention as shown in FIG. 1, the sidewall portions 20 each include a noise dampening gumstrip 42 and an apex insert 46. The gumstrips 42 are positioned as described above. The apex inserts 46 are located between the first ply 38 and the turnup ends 32 of ply 38 respectively.

For purposes of this invention, the maximum section width (SW) of the tire is measured parallel to the rotational axis of the tire from the axially outer surfaces of the tire, exclusive of indicia, adornment and the like. Also, for the purposes of this invention the tread width is the axial distance across the tire perpendicular to the equatorial plane (EP) of the tire as measured from the footprint of the tire inflated to maximum standard inflation pressure, at rated load and mounted on a wheel for which it was designed.

The tire 10 illustrated in FIG. 1 of the preferred embodiment tire has a fabric overlay layer 59 disposed about the tread reinforcing belt structure 36. For example, two ply layers having PEN, PET, PVA, rayon or aramid cords may be disposed above each reinforcing belt structures 36, the lateral ends extending past the lateral ends of the belt structures 36. Alternatively, a single layer of spirally wound reinforced fabric can be employed as an overlay. The preferred embodiment tire 10 employed spirally wound aramid cords 70, of the FLEXTEN 1670/3 or more preferably 1100/2 dTex. The aramid material has a substantially higher modulus of elasticity than nylon and accordingly results in a stronger tire reinforcement than two layers of nylon. Applicants have found that an increase in high speed capability can be achieved in a tire with the single layer of aramid overlay having at least 14 EPI, preferably about 17 EPI. Generally the use of aramid material in passenger tire applications is avoided due in part to the fact that the material exhibits poor noise properties that resonate sounds through the relatively thin sidewalls of the passenger tire. Applicants' tire of the present invention employs a noise-dampening insert 42 in the sidewalls 20 which noticeably dampen tire-generated noises. These noise dampening sidewalls 20 permit the use of an aramid overlay without experiencing unacceptable noise levels.

The cords 80 of the overlay 59 alternatively can be made of rayon, PET, PEN or PVA. A PEN filament cord having a density of 240 dTex to 2200 dTex and a twist multiplier of 5 to 10 can be employed, more preferably 1440/2 dTex having both a yarn and cord twist of between 4 and 12 turns per inch (tpi), preferably 7Z/9S can be employed.

The apex insert fillers 46, as shown, can be made of one or two or more distinct elastomeric materials. The preferred embodiments employed only one compound or material in the apex inserts 46 which extended from the bead core 26. The preferred apex insert material is very hard having a Shore D hardness of 50 or more, preferably 50 to 55. The hardness of the insert 46 was achieved by crosslinked reinforcing resins mixed to a commonly known mixing procedure to achieve a high hardness which permits a minimal amount of material to be used to form the apex insert 46.

The inserts 46 may alternatively be loaded with short fibers, which are preferably oriented at an angle of at least 45° to enhance the radial and lateral stiffness of the insert, preferably the fibers are radially oriented. Preferably the short fibers are made of textile or synthetic materials such as rayon, nylon, polyester or aramid. These short fibers can be radially directed or positioned at bias angles preferably at least 45° but should not be circumferentially extending.

Chafing of the tire 10 in the lower bead region radially outward of the carcass structure 30 adjacent the rim flange may be minimized, especially during use of the tire in an underinflated condition, by providing hard rubber chafer portion 60.

The belt structure 36 has non-folded belts 50,51 reinforced with rayon cords which preferably used from 1840/2 (twist 6/6 to 12/12 tpi) up to 2440/2/2 (twist 3/3 to 10/10 tpi), but preferably 2440/3 (twist 6.5/6.5 tpi), at a density of 18 to 24 EPI. The belts 50,51 had a width of about 98% of the mold tread cord width commonly referred to as the tread arc width.

To further enhance the tire 10 performance and light weight features the tread 12 was constructed having a minimal gauge or thickness (t) of the undertread 13. Conventionally for high performance passenger tire the undertread is reduced to between 2 and 5 mm. The tire of the present invention had an undertread less than 2 mm, preferably about 1 mm as measured from the radially outer cords 70 of the overlay 59 to a full depth circumferential groove bottom as shown in FIG. 1.

To insure the inventive tire 10 reduced the inherent stresses created when molding a tire having rayon belts 50,51 it was determined that the mold should be wide and flat at the tread. The tread radius of 315 mm and a tread arc width of 141 mm was evaluated with acceptable results. In a tire size of 195/65R15 91V, a tread radius of 914 mm and a tread arc width of 152 mm yielded most superior results. The inventors believe that a flat tread radius greater than 300 mm over a tread arc width of about 125 mm or more will provide acceptable results. More preferably the tread radius R should be greater than 500 mm for tread arc width of greater than 150 mm, most preferably R should be at least 750 mm. This wide flat tread arc permits the belt cords 80 to experience minimal thermal shrinkage distortion which could stress the cords of the ply 51, adjacent the carcass ply 38. This in combination with the ply cords 41 of low thermal shrinkage and an overlay 59 of similar low thermal shrinkage means that the tire 10 can be manufactured and placed in use such that the overlay 59, the ply 38 and the belts 50,51 will survive the exposure to thermal expansion and contraction without detrimental distortions.

A test control tire having a size 195/65R15 91V was made with the conventional steel belts the tire weight was 9.4 Kg. The same size tire made according to the present invention and has a weight of about 7.1 Kg, depending on the tuning of the tire 10 the weight when employing the inventive concepts described above have yielded weights in the 6.9 to 7.4 Kg range.

This weight reduction in and of itself was a most beneficial improvement over the prior art since it reduces the kinetic energy contribution of the tire, decreasing both translation and rotational energy and thus reducing fuel consumption.

Additionally, the reduced weight of the unsprung tire mass allows the car manufactures to redesign the suspension with reduced weight components to improve car weight, performance and handling.

The tire of the present invention brought about a 10% to 18% rolling resistance improvement vs the control tire of a classic construction made in the same mold with the same tread compound and a standard steel belt.

Treadwear improvements of 0 to 10% were observed in standard wear test of the tire 10 versus the conventional construction. The tire 10 was noticed to be less sensitive to wheel position wear. The shoulder wear of steering position and the centerline wear of the rear wheel position when lightly loaded were much less pronounced in the inventive tire 10 when compared to the prior art tires.

Flatspotting of the inventive tire was very much improved over prior art tires in terms of the amount of time required to recover disturbance free ride. Flatspotting is a condition that commonly occurs when a vehicle after being driven is parked causing the warm tire to cool such that the structure has a locally flattened casing structure.

Most importantly the inventive tire has demonstrated excellent durability and has passed plunger, road durability carcass fatigue, outdoor resiliometer, curb impact test, road plunger and legally required DOT and ECE R30 qualification tests.

Figure 2:
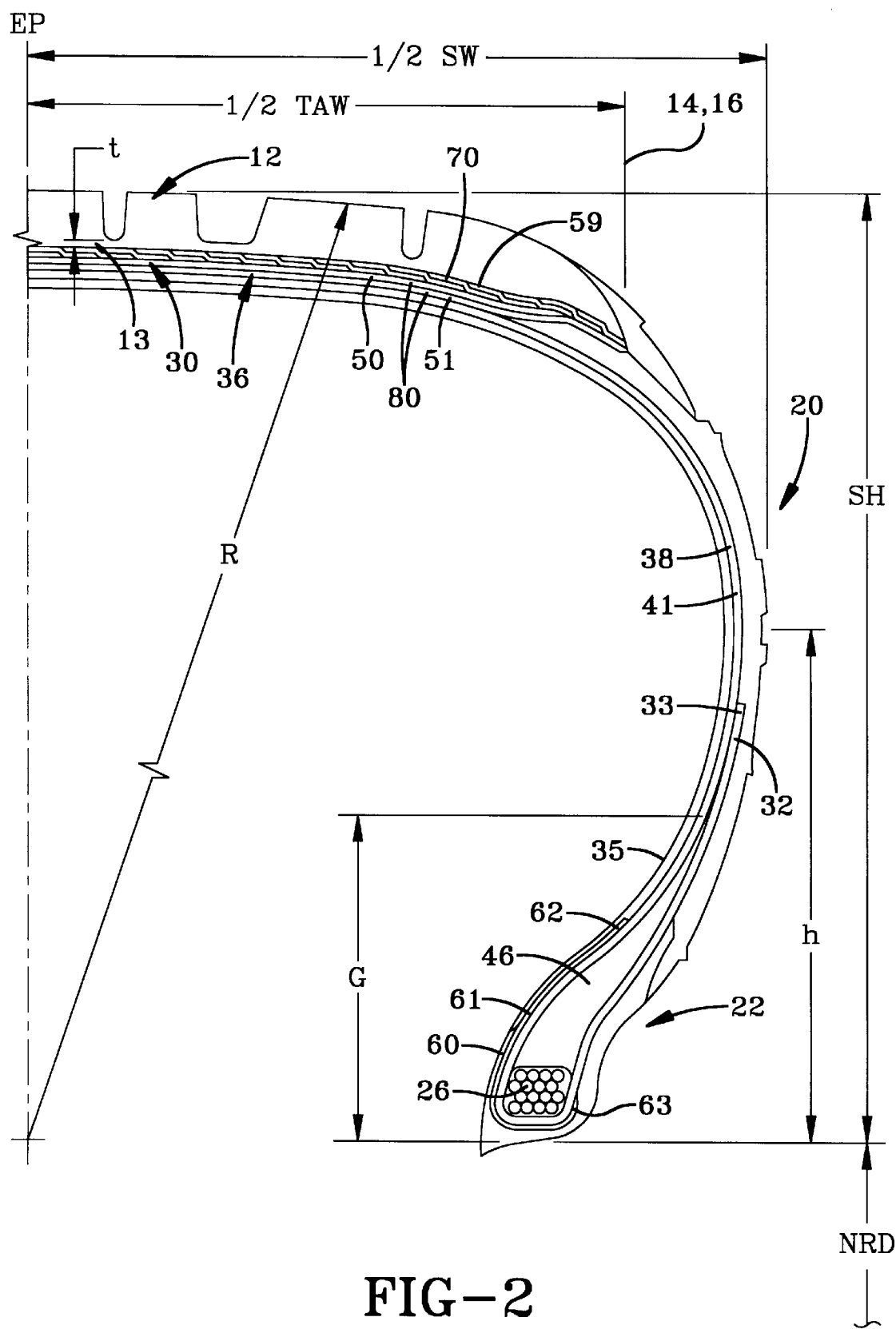
FIG. 2 is a cross-sectional view of the low cost version of the tire 10 similar to FIG. 1.

As shown in FIG. 2, the tire 1 can be manufactured at even lower cost by eliminating the reinforcements 52,53 and the noise dampening insert 42. Additionally, the overlay cords 70 can be rayon of lower cost relative to the use of aramid.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic radial ply passenger or light truck tire having an aspect ratio of 0.2 to 0.8, comprising a pair of parallel annular bead cores, one or more radial carcass plies of parallel cords, at least one radial carcass ply having a pair of turnups being wrapped around said bead cores, a belt structure disposed radially outwardly of said one or more radial carcass plies in a crown area of said tire, and an overlay having a width coinciding substantially with the width of said belt structure, a tread disposed radially outwardly of said overlay, the tread having a single tread radius (R) of greater than 500 mm over a tread arc width of 125 mm or more, and a sidewall disposed one between said tread and each of said bead cores, wherein said overlay comprises reinforcing filaments or cords embedded in an elastomer, the material of the filaments or cords being selected from the group consisting of rayon, polyethylene terephthalate (PET), aramid, polyethylene naphthalate (PEN) or polyvinyl alcohol (PVA), and said belt structure being made from two or more rayon cord reinforced layers having cord angles in the range of 18° to 26° with respect to the mid-circumferential centerplane of the tire.

2. The pneumatic radial ply tire of claim 1 wherein said overlay is spirally wound radially outward of said belt structure and is made from a continuous strip of elastomeric reinforcing tape having a width of ½ inch to 1½ inches and 4 to 45 of said reinforcing filaments or cords in parallel embedded therein.

3. The pneumatic radial ply tire of claim 1 wherein the reinforcing filaments or cords of the overlay are PEN cords having a density of 240 dTex to 2200 dTex.

4. The pneumatic radial ply tire of claim 3 wherein said PEN cords have a twist multiplier of 5 to 10.

5. The pneumatic radial ply tire of claim 3 wherein said PEN cords are 1440/2 dTex cords having a yarn and cord twist of 4 to 12 turns per inch (tpi).

6. The pneumatic radial ply tire of claim 1 wherein the reinforcing filaments or cords of the overlay are aramid cords.

7. The pneumatic radial ply tire of claim 6 wherein said aramid overlay cords are 1100/2 dTex cord.

8. The pneumatic radial ply tire of claim 6 wherein the aramid overlay cords have a density of about 15 to 30 ends per inch (EPI).

9. The pneumatic radial ply tire of claim 1 wherein the tread has an undertread as measured from the radially outer surface of the filaments or cords of the overlay to a circumferential groove of full depth, the undertread having a thickness of less than 2 mm.

10. The pneumatic radial ply tire of claim 9 wherein the undertread has a thickness of about 1 mm.

11. The pneumatic radial ply tire of claim 1 further comprising an apex extending radially outwardly above each of the bead cores and adjacent the at least one radial carcass ply, the apex having a Shore D hardness greater than or equal to 50.

12. The pneumatic radial ply tire of claim 11 further comprising two sidewall inserts, one insert in each sidewall, each insert being two elastomeric layers reinforced by bias cords, the cords of a first layer being oriented equal but opposite to those of the second layer, the two layers being interposed between the apex and the turnup of the at least one radial carcass ply.

13. The pneumatic radial ply tire of claim 12 wherein the first and second layers have bias cord angles of 25° to 60° relative to the radial direction.

14. The pneumatic radial ply tire of claim 12 wherein each first and second layer has a radially inner end and a radially outer end, the respective ends of one layer being staggered relative to the ends of the opposite layer, the radially outer end of one layer being located at about one-half of the tire's section height.

15. The pneumatic radial ply tire of claim 1 further comprising an innerliner and a noise dampening gumstrip, the gumstrip lying between the innerliner and the innermost radial carcass ply one originating below each belt edge and terminating at about 50% of the section height of the tire.

16. The pneumatic radial ply tire of claim 1 wherein the parallel cords of the one or more radial carcass plies are rayon cords.

17. The pneumatic radial ply tire of claim 1 wherein the parallel cords of the one or more radial carcass plies are nylon cords.

18. The pneumatic radial ply tire of claim 1 wherein the parallel cords of the one or more radial carcass plies are PEN cords.

19. The pneumatic radial ply tire of claim 1 wherein the parallel cords of the one or more radial carcass plies are aramid cords.

20. The pneumatic radial ply tire of claim 1 wherein the parallel cords of the one or more radial carcass plies are steel cords.

21. The pneumatic radial ply tire of claim 1 wherein the rayon cord material of the belt structure is from 1840/2 up to 2440/2/2.

22. The pneumatic radial ply tire of claim 21 wherein the rayon cords of the belt structure have a density of from 18 to 24 ends per inch (EPI).

23. A pneumatic radial ply tire having an aspect ratio of 0.2 to 0.8, comprising a pair of parallel annular bead cores, one or more radial carcass plies of parallel cords, at least one radial carcass ply having a pair of turnups being wrapped around said bead cores, a belt structure disposed radially outwardly of said one or more radial carcass plies in a crown area of said tire, and an overlay having a width coinciding substantially with the width of said belt structure, a tread disposed radially outwardly of said overlay, and a sidewall disposed one between said tread and each of said bead cores, wherein said overlay comprises reinforcing filaments or cords embedded in an elastomer, the material of the filaments or cords being selected from the group consisting of rayon, polyethylene terephthalate (PET), aramid, polyethylene naphthalate (PEN) or polyvinyl alcohol (PVA), and said belt structure being made from two or more rayon cord reinforced layers having cord angles in the range of 18° to 26° with respect to the mid-circumferential centerplane of the tire, wherein said tire further comprises an innerliner and a noise dampening gumstrip, the gumstrip lying between the innerliner and the innermost radial carcass ply one originating below each belt edge and terminating at about 50% of the section height of the tire.

24. The pneumatic radial ply tire of claim 23 wherein said overlay is spirally wound radially outward of said belt structure and is made from a continuous strip of elastomeric reinforcing tape having a width of ½ inch to 1½ inches and 4 to 45 of said reinforcing filaments or cords in parallel embedded therein.

25. The pneumatic radial ply tire of claim 23 wherein the reinforcing filaments or cords of the overlay are PEN cords having a density of 240 dTex to 2200 dTex.

26. The pneumatic radial ply tire of claim 25 wherein said PEN cords have a twist multiplier of 5 to 10.

27. The pneumatic radial ply tire of claim 25 wherein said PEN cords are 1440/2 dTex cords having a yarn and cord twist of 4 to 12 turns per inch (tpi).

28. The pneumatic radial ply tire of claim 23 wherein the reinforcing filaments or cords of the overlay are aramid cords.

29. The pneumatic radial ply tire of claim 28 wherein said aramid overlay cords are 1100/2 dTex cords.

30. The pneumatic radial ply tire of claim 28 wherein the aramid overlay cords have a density of about 15 to 30 ends per inch (EPI).

31. The pneumatic radial ply tire of claim 23 wherein the tread has an undertread as measured from the radially outer surface of the filaments or cords of the overlay to a circumferential groove of full depth, the undertread having a thickness of less than 2 mm.

32. The pneumatic radial ply tire of claim,31 wherein the undertread has a thickness of about 1 mm.

33. The pneumatic radial ply tire of claim 23 further comprising an apex extending radially outwardly above each of the bead cores and adjacent the at least one radial carcass ply, the apex having a Shore D hardness greater than or equal to 50.

34. The pneumatic radial ply tire of claim 33 further comprising two sidewall inserts, one insert in each sidewall, each insert being two elastomeric layers reinforced by bias cords, the cords of a first layer being oriented equal but opposite to those of the second layer, the two layers being interposed between the apex and the turnup of the at least one radial carcass ply.

35. The pneumatic radial ply tire of claim 34 wherein the first and second layers have bias cord angles of 25° to 60° relative to the radial direction.

36. The pneumatic radial ply tire of claim 34 wherein each first and second layer has a radially inner end and a radially outer end, the respective ends of one layer being staggered relative to the ends of the opposite layer, the radially outer end of one layer being located at about one-half of the tire's section height.

37. The pneumatic radial ply tire of claim 23 wherein the tread has a single tread radius (R) of greater than 300 mm over a tread arc width of 125 mm or more.

38. The pneumatic radial ply tire of claim 23 wherein the parallel cords of the one or more radial carcass plies are rayon cords.

39. The pneumatic radial ply tire of claim 23 wherein the parallel cords of the one or more radial carcass plies are nylon cords.

40. The pneumatic radial ply tire of claim 23 wherein the parallel cords of the one or more radial carcass plies are PEN cords.

41. The pneumatic radial ply tire of claim 23 wherein the parallel cords of the one or more radial carcass plies are aramid cords.

42. The pneumatic radial ply tire of claim 23 wherein the parallel cords of the one or more radial carcass plies are steel cords.

43. The pneumatic radial ply tire of claim 23 wherein the rayon cord material of the belt structure is from 1840/2 up to 2440/2/2.

44. The pneumatic radial ply tire of claim 43 wherein the rayon cords of the belt structure have a density of from 18 to 24 ends per inch (EPI).

* * * * *